United States Patent
Gansloser et al.

(10) Patent No.: US 6,845,690 B2
(45) Date of Patent: Jan. 25, 2005

(54) TRANSMISSION SYSTEM AND METHOD OF MAKING SAME

(75) Inventors: Philip Gansloser, Amstetten (DE); Juergen Greiner, Leutenbach (DE); Helmut Sandner, Neuhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/189,781

(22) Filed: Jul. 8, 2002

(65) Prior Publication Data

US 2003/0037986 A1 Feb. 27, 2003

(30) Foreign Application Priority Data

Jul. 7, 2001 (DE) .......................................... 101 33 118

(51) Int. Cl.⁷ .......................... F16H 37/00; B60K 17/00
(52) U.S. Cl. ...................... 74/665 R; 74/721; 180/358; 180/383
(58) Field of Search .............................. 74/665 R, 664, 74/721, 665 P, 665 G; 180/235, 348, 358, 374, 376, 383, 384, 905, 906; 475/202

(56) References Cited

U.S. PATENT DOCUMENTS

| | | | | |
|---|---|---|---|---|
| 3,262,512 A | | 7/1966 | O'Brien | |
| 3,636,909 A | * | 1/1972 | Benson, Jr. | 440/75 |
| 4,165,793 A | * | 8/1979 | Marsch et al. | 180/233 |
| 4,289,213 A | | 9/1981 | Seaman | 180/233 |
| 4,303,400 A | * | 12/1981 | Yano et al. | 440/75 |
| 4,325,450 A | * | 4/1982 | Ward | 180/247 |
| 4,688,447 A | * | 8/1987 | Dick | 74/665 T |
| 4,860,612 A | * | 8/1989 | Dick et al. | 74/665 H |
| 5,669,460 A | * | 9/1997 | Showalter | 180/233 |
| 5,704,868 A | * | 1/1998 | Lindsey et al. | 475/222 |
| 5,725,453 A | * | 3/1998 | Zalewski et al. | 475/204 |
| 6,578,657 B2 | * | 6/2003 | Baxter, Jr. | 180/376 |

* cited by examiner

Primary Examiner—Tisha Lewis
(74) Attorney, Agent, or Firm—Crowell & Moring LLP

(57) ABSTRACT

A transmission system for a motor vehicle, which contains a vehicle transmission equipped for longitudinal installation with a gear output shaft that points in the direction of the rear of the motor vehicle in the installed state is provided, wherein the shaft can be connected and be supported for rotation on an input shaft of a front axle gear unit via a driven shaft of a lateral drive unit and via a cardan shaft. For the purpose of reducing at least one deflection angle of the cardan shaft, at least one shaft corresponding to the cardan shaft is swiveled towards the gear output shaft of the vehicle transmission system.

21 Claims, 4 Drawing Sheets

TRANSMISSION SYSTEM AND METHOD OF MAKING SAME

BACKGROUND AND SUMMARY OF THE INVENTION

This application claims the priority of German Patent Document DE 101 33 118.5, filed on Jul. 7, 2001, the disclosure of which is expressly incorporated by reference herein.

The invention relates to a transmission system for a motor vehicle comprising a vehicle transmission equipped for longitudinal installation with a gear output shaft that points in the direction of the rear of the motor vehicle in the installed state.

From U.S. Pat. No. 4,289,213 a transfer case for a motor vehicle is known, which contains a vehicle transmission system equipped for longitudinal installation with a gear output shaft that points in the direction of the rear of the motor vehicle in the installed state. The gear output shaft can be connected and supported for rotation on an input shaft via a transfer case and via a cardan shaft. This cardan shaft is guided laterally along a gear housing of the vehicle transmission system to the front axle gear unit. An intermediate shaft that is connected with the cardan shaft via a cardan joint can swivel to the gear output shaft of the vehicle transmission system.

Furthermore, in particular, transmissions in all-wheel drives are known, which contain an automatic transmission that was originally designed for rear wheel drive and where based on the so-called "add-on principle" an additional drive connection is established with a front axle gear unit via a cardan shaft.

An aspect of the invention is based on making a generic transmission available, which can be integrated into a narrow vehicle tunnel and nevertheless has small deflection angles of the cardan shaft. It is resolved pursuant to certain preferred embodiments of the invention wherein for reducing at least one deflection angle of the cardan shaft, at least one shaft connected to the cardan shaft is swiveled towards the gear output shaft of the vehicle transmission and wherein at least one gear wheel of the lateral drive unit is conical. Further embodiments result from additional features and configurations.

A transmission system for a motor vehicle, which contains a vehicle transmission equipped for longitudinal installation with a gear output shaft that points in the direction of the rear of the motor vehicle in the installed state is provided, wherein the shaft can be connected and be supported for rotation on an input shaft of a front axle gear unit via a driven shaft of a transfer case and via a cardan shaft.

It is suggested that for reducing at least one deflection angle of the cardan shaft at least one shaft corresponding to the cardan shaft be able to swivel to the gear output shaft of the vehicle transmission. A smaller axis distance between the gear output shaft of the vehicle transmission and driven shaft of the transfer case can be made possible despite small deflection angles. The transfer case can have a space saving, lightweight and cost-effective design and the transmission system can be integrated in a narrow vehicle tunnel in particular due to the space-saving transfer case.

The swiveling of the shaft of the transfer case is beneficially accomplished by designing the transfer case as an angular gear with bevel wheels or by designing the transfer case as a wheel chain with at least three gear wheels, wherein at least one gear wheel is conical. A transfer case designed as a wheel chain can take on a particularly space-saving design.

The swiveled shaft, which is in the flow of power between the gear output shaft and the cardan shaft, can be designed as a hollow shaft with external toothing in the extreme case, which holds a joint of the cardan shaft radially inside.

Certain preferred embodiments of the invention can be applied in pure front-wheel drives with manual transmissions and in particular with automatic transmissions. Particularly beneficial however is the application in all-wheel drives, which have a vehicle transmission, especially automatic transmission, that is designed for rear-wheel drive, i.e. where the gear output shaft can be connected and supported for rotation on an input shaft of a rear axle gear unit and the gear output shaft based on the so-called "add-on principle" can be connected and supported for rotation on an input shaft of a front axle gear unit via a cardan shaft. Despite a vehicle transmission that is basically designed for rear-wheel drive, the cardan shaft can be guided with small deflection angles along a housing of the vehicle transmission at a small distance. Shell modifications on a tunnel for all-wheel drive variations of a vehicle equipped basically with purely a rear-wheel drive can be reduced to a minimum or possibly be completely eliminated.

In a beneficial embodiment, either the input shaft of the front axle gear unit corresponding to the cardan shaft and/or the driven shaft of the transfer case corresponding to the cardan shaft can swivel towards the gear output shaft, specifically vertically and/or horizontally. Instead of swiveling the input shaft of the front axle gear unit or the driven shaft of the transfer case it is basically also feasible to provide additional swiveling intermediate shafts.

The input shaft of the front axle gear unit is beneficially swiveled vertically and/or horizontally by an angle between 1° and 10° and the driven shaft of the transfer case is beneficially swiveled vertically and/or horizontally by an angle between 1° and 20°.

In order to swivel the input shaft of the front axle gear unit and/or the driven shaft of the transfer case, all designs that appear reasonable to the expert are feasible.

In particular, however, a swiveled input shaft of the front axle gear unit can be accomplished by either arranging the entire front axle gear unit in a swiveling manner, which allows a less expensive standard front axle gear unit to be used, or by allowing the front axle gear unit to exhibit beneficially an angular gear with an angle not equal to 90°. In the latter case, lateral shafts of the vehicle can take on a standard design.

In another embodiment of the invention, it is suggested to swivel a rotational axis of an intermediate gear wheel of the transfer case design as wheel chain to the gear output shaft, wherein beneficially a favorable swivel angle of the driven shaft of the transfer case, an additional position adjustment as well as beneficial gear ratios can be accomplished in a simple and cost effective manner.

Furthermore, space can be saved by incorporating the transfer case designed as wheel chain in a swiveling manner about a rotational axis, preferably about an angle between 20° and 40°.

When the vehicle transmission system contains a gear housing with a molded-on storage unit for the transfer case, an additional intermediate housing can be avoided between the vehicle transmission and the transfer case, and thus additional components, space, assembly efforts and costs can be saved.

Other objects, advantages and novel features of the present invention will become apparent from the following detailed description of the invention when considered in conjunction with the accompanying drawings.

DETAILED DESCRIPTION OF THE DRAWINGS

Figure 1:
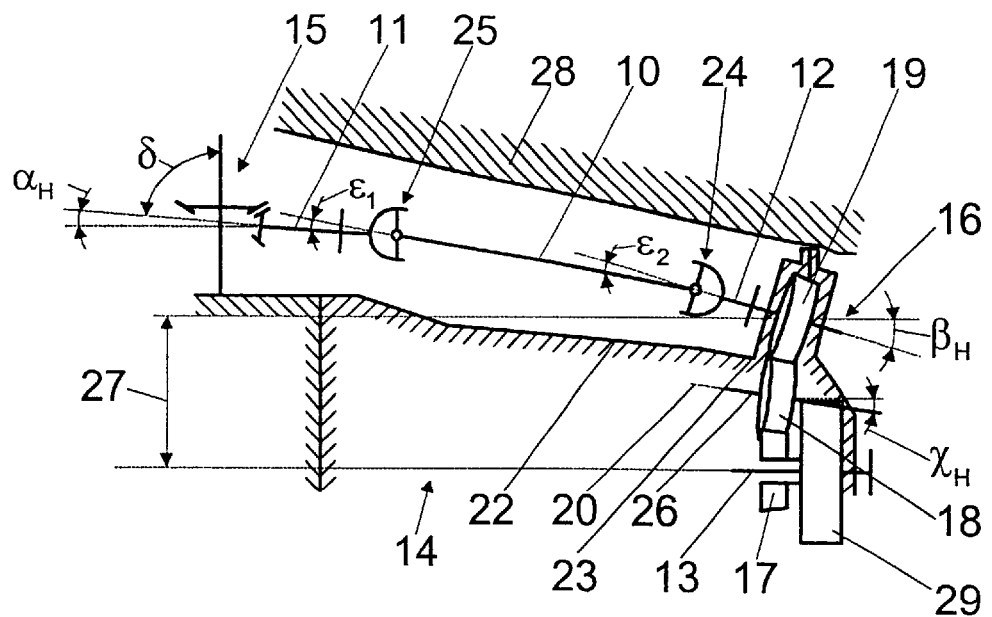
FIG. 1 shows a top view of a diagrammatic view of the transmission system, wherein it comprises a transfer case with a wheel chain having three conical gear wheels.

FIG. 1 shows a diagrammatic view of a transmission system for a motor vehicle pursuant to certain preferred embodiments of the invention, which contains an automatic transmission 14 provided for longitudinal installation with a gear output shaft 13 that points in the direction of the rear of the motor vehicle in the assembled state.

The automatic transmission 14 is basically designed purely for rear-wheel drive. In the assembled state of the automatic transmission 14, the gear output shaft 13 is connected and supported for rotation on an input shaft, which is not shown in detail, of a rear axle gear unit.

The automatic transmission 14 includes a gear housing 22 with a molded-on storage unit 23 for a lateral drive unit 16 so that the automatic transmission 14 can be used in a low-cost manner based on the so-called "add-on principle" for all-wheel drive variations.

In such a variation the gear output shaft 13, which is longer compared to the pure rear-wheel drive variation, is connected via a transfer case 29 with the input shaft of the rear axle gear unit, and via the transfer case 29 a driven shaft 12 of the lateral drive unit 16 and via a cardan shaft 10 with two compensating joints 24, 25 and supported for rotation on an input shaft 11 of a front axle gear unit 15. The driven torque can be distributed via the transfer case 29 to the front axle gear unit 15 and the rear axle gear unit and speed differences can be compensated.

The cardan shaft 10 encloses a first deflection angle $\epsilon_1$ with the input shaft 11 of the front axle gear unit 15 and a second deflection angle $\epsilon_2$ with the driven shaft 12 of the lateral drive unit 16. According to certain preferred embodiments of the invention, in order to reduce the deflection angles $\epsilon_1$, $\epsilon_2$ the shafts 11, 12 corresponding to the cardan shaft 10 are swiveled, specifically the input shaft 11 of the front axle gear unit 15 and the driven shaft 12 of the lateral drive unit 16, towards the gear output shaft 13 of the automatic transmission 14.

Figure 2:
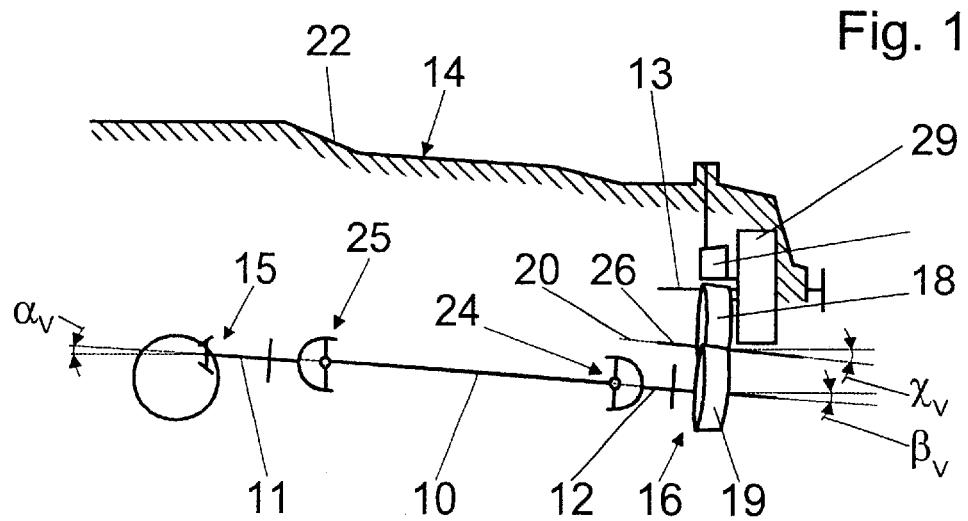
FIG. 2 shows a side view of the transmission system from FIG. 1.

The input shaft 11 of the front axle gear unit 15 can swivel vertically and horizontally about an angle $\alpha H$, $\alpha V$ of about 2° towards the gear output shaft 13, specifically in the direction of the driven shaft 12 of the lateral drive unit 16 (FIGS. 1 and 2).

In order to achieve a desired swivel angle of the input shaft 11, the front axle gear unit 15 is formed by an angular gear at an angle δ not equal to 90°, specifically at an angle δ of about 88° (FIG. 1).

The driven shaft 12 of the lateral drive unit 16 is swiveled vertically and horizontally about an angle $\beta H$, $\beta V$ of about 7° towards the gear output shaft 13, specifically in the direction of the input shaft 11 of the front axle gear unit 15.

The lateral drive unit 16 is formed by a wheel chain with three conical gear wheels 17, 18, 19, specifically by a drive pinion 17 pivoting on the gear output shaft 13, an intermediate wheel 18 pivoting on a pivot pin 26 and an output gear 19 arranged stationarily on the driven shaft 12.

Figure 3:
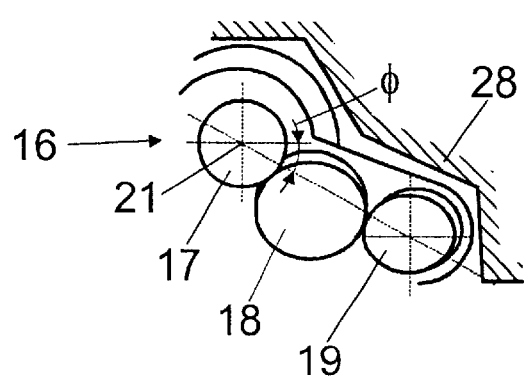
FIG. 3 shows a front view of the transmission system from FIG. 1.

The intermediate gear wheel 18 of the lateral drive unit 16 has a horizontally and vertically swiveled rotational axis 20, specifically horizontally and vertically about an angle $\chi H$, $\chi V$ of about 5°. Furthermore the lateral drive unit 16 and/or the wheel chain can swivel about a rotational axis 21, specifically about an angle $\phi$ of about 25° (FIG. 3).

Despite the small axis spacing 27 between the gear output shaft 13 of the automatic transmission 14 and the driven shaft 12 of the lateral drive unit 16, the cardan shaft 10 has small deflection angles $\epsilon_1$, $\epsilon_2$ to its corresponding shafts 11, 12 and the transmission system can be integrated in a narrow vehicle tunnel 28 in a space-saving manner.

Figure 4:
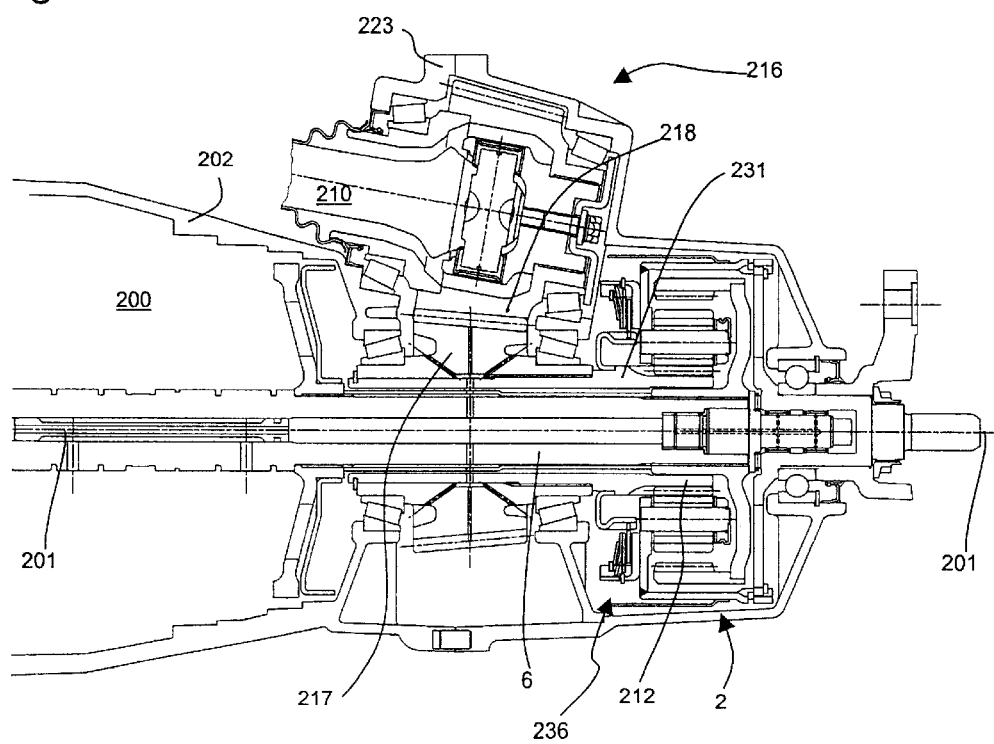
FIG. 4 shows a detailed and cut view of the transmission system similar to that from FIG. 1 through FIG. 3, wherein a wheel chain of the transfer case comprises only two conical gear wheels.

FIG. 4 shows a transmission system, which forms part of a longitudinally installed drive train for a motor vehicle. Apart from an automatic transmission 200, the drive train contains a gear output shaft that points in the direction of the rear of the motor vehicle in the assembled state. This gear output shaft forms the input shaft 6 of the differential gear 2.

The automatic transmission 200 contains a gear housing 202 with a molded-on bearing housing 223 for a lateral drive unit 216 so that the automatic transmission 200 can be used for an all-wheel variation based on the so-called "add-on principle" in an inexpensive manner.

In such a variation, the gear output shaft or input shaft 6, which is longer compared to the pure rear-wheel drive variation, is connected via the differential gear 2 and a rear-wheel drive cardan shaft with a pinion shaft of a rear axle gear unit, which is not shown in detail, in such a way that a first portion of the driving torque is transmitted to the rear axle gear unit. A second portion of the driving torque is transmitted from the input shaft 6 via the differential gear 2, a drive pinion 217, an output gear 218, a cardan shaft 210 of the lateral drive unit 216, and a conical pinion shaft of a front axle gear unit, which is not shown in detail, to a front axle. Via the differential gear 2, driven torque can be distributed to the front axle gear unit and the rear axle gear unit and speed differences can be compensated.

The cardan shaft 210 of the lateral drive unit 216 can swivel horizontally about an angle of about 8° towards the drive train longitudinal axis 201. The cardan shaft 210 of the lateral drive unit 216 can swivel vertically about an angle of about 4° towards the drive train longitudinal axis 201.

The lateral drive unit 216 is formed by two gear wheels, specifically by the drive pinion 217 and the output gear 218 engaging with it. The drive pinion 217 is connected in a stationary manner with a hollow shaft 231, which has a single-piece design with a sun gear 212 of the differential gear 2. Within this hollow shaft 231, the input shaft 6 is arranged. The output gear 218 is basically a hollow shaft with external toothing, which is seated in the bearing housing 223 via a tapered roller bearing in an x-configuration.

In order to produce the horizontal angle and the vertical angle, which is not shown in detail, the cardan shaft 210 is arranged via a cardan joint radially within the output gear 218 in an articulating manner. Furthermore, the cardan shaft 210 is coupled in the driving direction on the front—i.e. on its other end—with another cardan joint in an articulating manner to the tapered pinion shaft, which is not shown in detail, of the front axle gear unit.

In the transmission system pursuant to FIG. 4, the drive pinion 217 and the output gear 218 engaging with it are each designed as conical spur gears. The cardan shaft 210 is arranged on the right side in the driving direction of the driving motor, which is not shown in detail.

Furthermore the transmission system contains a temperature-dependent torque-dampening friction clutch 236 for the purpose of dampening load impact. Such a temperature-dependent friction clutch 236 is described in the unpublished document DE 101 11 257.2. The sun gear 212 and a planet carrier of the differential gear 2 are coupled with each other via the friction clutch 236. The clutch torque of the friction clutch 236, which can be transmitted without slippage, is so small that it automatically moves to a friction slipping operation with torque jerks and torque differences, as they occur generally between the differential components during common vehicle operation. The friction clutch 236 is equipped with a temperature-dependent adjusting device, which in a specified temperature range reduces the clutch disengaging pressure and thus the clutch torque that can be transmitted as a function of the clutch temperature with increasing clutch temperature and increases it with decreasing clutch temperature.

Figure 5:
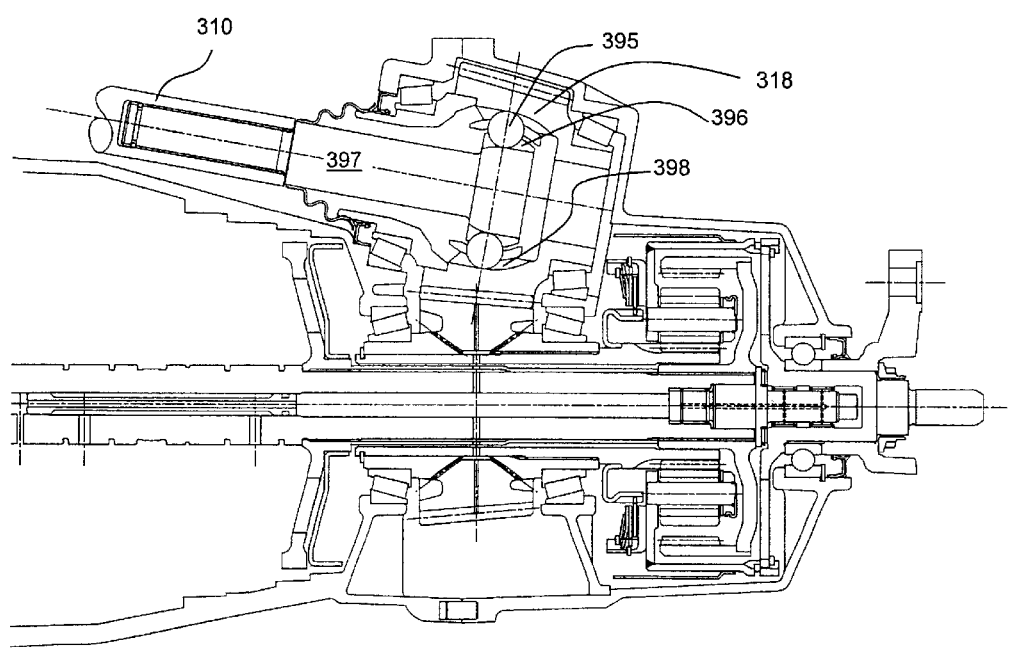
FIG. 5 shows a detailed and cut view of the transmission system similar to that from FIG. 4, however where instead of a cardan joint another type of joint is used.

FIG. 5 shows a detailed and cut view of the transmission system similar to that of FIG. 4, however wherein instead of the cardan joint a different type of joint is used. In this homokinetic type of joint, rounded groove paths 398 are incorporated into an output gear 318. The groove paths 398 extend substantially parallel to the rotational axis of the output gear 318, which is designed as a hollow shaft with exterior toothing. Corresponding to these groove paths 398, a joint part 397 that is connected with the cardan shaft 310 contains grooves 396 for seating balls 395. The driving torque for the front axle is transmitted via these balls 395.

Basically, in additional alternative embodiments, the use of all familiar homokinetic joints is possible. For example double-offset joints, ball joints, receppa joints, tripoden joints and ring joints can also be used.

Figure 6:
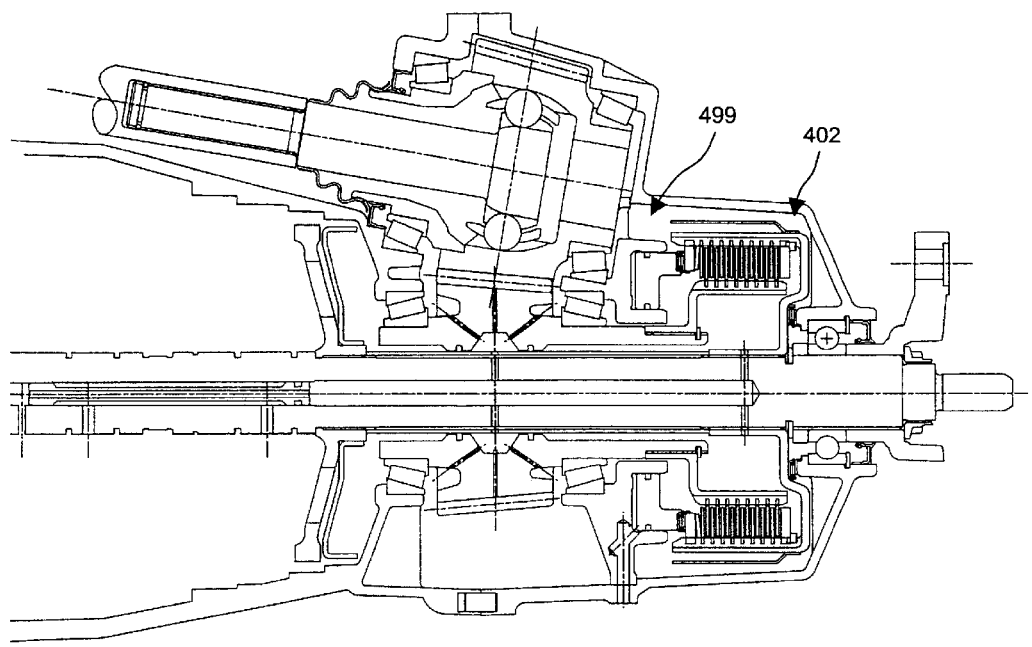
FIG. 6 shows a detailed and cut view of the transmission system similar to that from FIG. 5, where instead of a differential gear a multi-plate clutch is used for the transfer case.

FIG. 6 shows a detailed and cut view of a transmission system similar to that of FIG. 5, however for the transfer case a multi-plate clutch 402, which runs in an oil bath, is used instead of the differential gear.

The power distribution onto the front axle and rear axle can be adjusted continuously variable in such a multi-plate clutch 402 via an actuator 499. In this, the existing requirements can be taken into consideration. For example, the selection of the actuator 499 per data bus is in an information exchange relation with the wheel, drive unit and steering sensors.

The vehicle transmission system shown in the various embodiments can be an automatic transmission, a manual transmission, a semi-automated mechanically geared transmission, a fully automated mechanically geared transmission and a continuously variable transmission. Continuously variable transmissions are basically divided into belt-wrap transmissions and roll barrel transmission such as e.g. toroidal drives.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Transmission system for a motor vehicle, comprising a vehicle transmission equipped for longitudinal installation with a gear output shaft that points in a direction of a rear of the motor vehicle in an installed state, wherein the gear output shaft can be connected to an input shaft of a front axle gear unit via a driven shaft of a lateral drive unit and via a cardan shaft, and wherein for reducing at least one deflection angle of the cardan shaft at least one shaft connected to the cardan shaft is swiveled both horizontally and vertically towards the gear output shaft of the vehicle transmission, and wherein at least one gear wheel of the lateral drive unit is conical.

2. Transmission system according to claim 1, wherein the gear output shaft can be connected to an input shaft of a rear axle gear unit.

3. Transmission system according to claim 1, wherein the input shaft of the front axle gear unit corresponding to the cardan shaft is swiveled towards the gear output shaft of the vehicle transmission.

4. Transmission system according to claim 2, wherein the input shaft of the front axle gear unit corresponding to the cardan shaft is swiveled towards the gear output shaft of the vehicle transmission.

5. Transmission system according to claim 1, wherein the input shaft of the front axle gear unit is swiveled vertically or horizontally by an angle between 1° and 10°.

6. Transmission system according to claim 3, wherein the front axle gear unit has an angular gear with an angle not equal to 90°.

7. Transmission system according to claim 5, wherein the front axle gear unit has an angular gear with an angle not equal to 90°.

8. Transmission system according to claim 1, wherein the driven shaft of the lateral drive unit corresponding to the cardan shaft is swiveled towards the gear output shaft of the vehicle transmission system.

9. Transmission system according to claim 3, wherein the driven shaft of the lateral drive unit corresponding to the cardan shaft is swiveled towards the gear output shaft of the vehicle transmission system.

10. Transmission system according to claim 6, wherein the driven shaft of the lateral drive unit corresponding to the cardan shaft is swiveled vertically or horizontally by an angle between 1° and 20°.

11. Transmission system according to claim 8, wherein the lateral drive unit is formed by a wheel chain with at least three gear wheels.

12. Transmission system for a motor vehicle, comprising a vehicle transmission equipped for longitudinal installation with a gear output shaft that points in a direction of a rear of the motor vehicle in an installed state, wherein the gear output shaft can be connected and be supported for rotation on an input shaft of a front axle gear unit via a driven shaft of a lateral drive unit and via a cardan shaft, wherein for reducing at least one deflection angle of the cardan shaft at least one shaft connected to the cardan shaft is swiveled towards the gear output shaft of the vehicle transmission, and wherein at least one gear wheel of the lateral drive unit is conical, wherein the driven shaft of the lateral drive unit corresponding to the cardan shaft is swiveled towards the gear output shaft of the vehicle transmission system, wherein the lateral drive unit is formed by a wheel chain with at least three gear wheels, and wherein a rotational axis of an intermediate gear wheel of the lateral drive unit can swivel towards the gear output shaft.

13. Transmission system according to claim 11, wherein the lateral drive unit can swivel about a rotational axis.

14. Transmission system according to claim 12, wherein the lateral drive unit can swivel about a rotational axis.

15. Transmission system according to claim 1, wherein the vehicle transmission contains a gear housing with a molded-on bearing unit for the lateral drive unit.

16. A transmission assembly for a vehicle, comprising:

a transmission having a front output shaft pointing to a rear of the vehicle and being equipped for longitudinal installation, the gear output shaft being connectable to an input shaft of a front axle gear unit via a driven shaft of a lateral drive unit and via a cardan shaft, wherein, in order to reduce at least one deflection angle of the cardan shaft, at least one shaft operatively connected to the cardan shaft is swiveled both horizontally and vertically towards the gear output shaft, at least one gear wheel of the lateral drive unit being conical.

17. A method of making a transmission system for a vehicle, comprising:

installing the transmission so that a gear output shaft of the transmission points in a direction of a rear of the vehicle;

connecting the gear output shaft to an input shaft of a front axle gear unit via a driven shaft of a lateral drive unit and via a cardan shaft, and swiveling at least one shaft connected to the cardan shaft both horizontally and vertically towards the gear output shaft in order to reduce at least one deflecton angle of the cardan shaft, wherein at least one gear wheel of the lateral drive unit is conical.

18. The transmission assembly according to claim 16, wherein the input shaft of the front axle gear unit is swiveled relative to the longitudinal direction of the vehicle in order to reduce the at least one deflecton angle of the cardan shaft.

19. The method according to claim 17, further comprising swirveling the input shaft of the front axle gear unit relative to the longitudinal direction of the vehicle in order to reduce the at least one deflecton angle of the cardan shaft.

20. A transmission system for a motor vehicle, comprising:

a vehicle transmission having a gear output shaft that points in a direction of a rear of the motor vehicle in an installed state;

a front axle gear unit having an input shaft;

a lateral drive unit having a driven shaft; and a cardan shaft, wherein the gear output shaft of the transmission is connected to the input shaft of the front axle gear unit via the driven shaft of the lateral drive unit and via the cardan shaft, and wherein the input shaft of the front axle gear unit is swiveled from a longitudinal direction of the vehicle to reduce a deflection angle of the cardan shaft.

21. A method of making a transmission system for a vehicle, comprising:

installing a transmission so that a gear output shaft of the transmission points in a direction of a rear of the motor vehicle;

connecting the gear output shaft of the transmission to an input shaft of a front axle gear unit via a driven shaft of a lateral drive unit and via a cardan shaft; and swiveling the input shaft of the front axle gear unit from a longitudinal direction of the vehicle to reduce a deflection angle of the cardan shaft.

* * * * *